March 4, 1930.　　　　H. FORD　　　　1,749,099
TRANSMISSION
Filed Oct. 5, 1927　　　2 Sheets-Sheet 1

INVENTOR.
Henry Ford.
BY C. R. Halbut
　　 E. H. Davis
　　　　　ATTORNEYS.

March 4, 1930.  H. FORD  1,749,099
TRANSMISSION
Filed Oct. 5, 1927  2 Sheets-Sheet 2
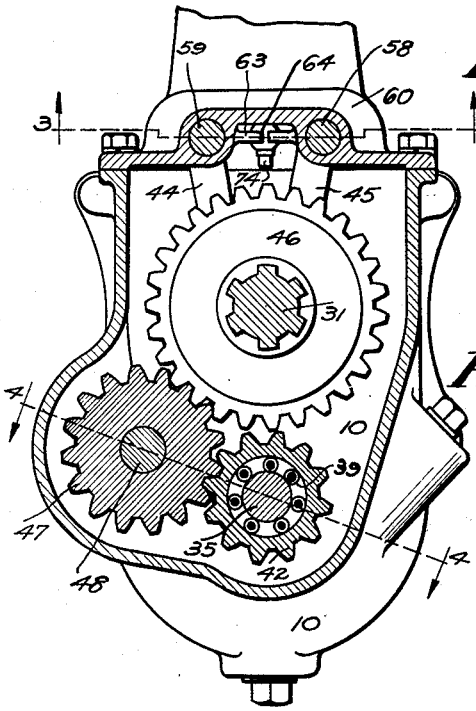
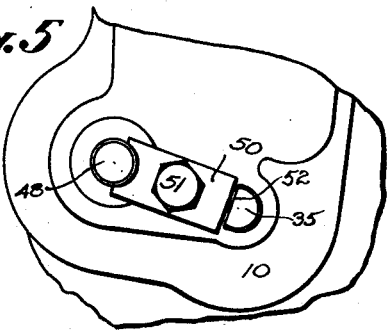
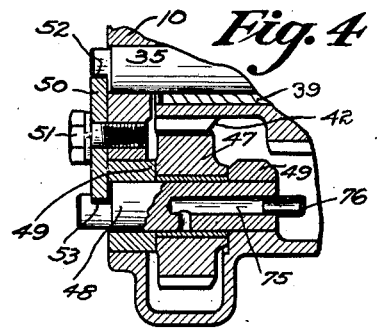
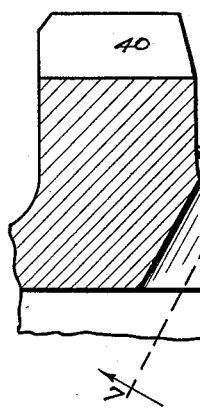
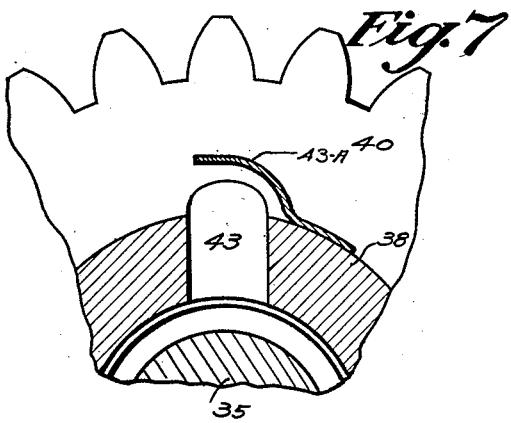
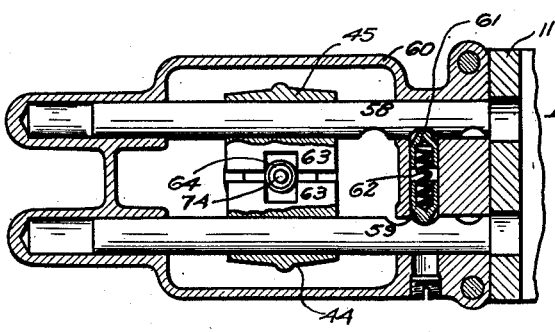
INVENTOR.
Henry Ford.
BY G. R. Halbert
ATTORNEYS Patented Mar. 4, 1930

1,749,099

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

TRANSMISSION

Application filed October 5, 1927. Serial No. 224,095.

The object of my invention is to provide a transmission of simple, durable and inexpensive construction.

Still a further object of my invention is to provide a transmission for use in connection with automobiles wherein novel means may be provided for lubricating the various parts thereof.

Still a further object of my invention is to provide in connection with such a transmission means for interlocking the gear shift devices so that two gear trains cannot be meshed at the same time and so that the shift lever will be yieldingly locked in all of its adjusted positions.

Still a further object of my invention is to provide a novel means for mounting the shift lever in the transmission cover whereby the shift lever may be mounted to make the necessary movements readily, but a dust and grease tight joint will be formed between the shift lever and the transmission cover and the removal of the shift lever from the transmission cover may be readily accomplished when the cover has been removed from the transmission but the shift lever can not be accidently displaced.

Still a further object of my invention is to provide the transmission cover with a ball seat and the shift lever with a ball and then to provide a spring which may engage the shift lever to draw the ball into the ball seat and at the same time to press a felt washer against the under side of the transmission cover to prevent leakage of dirt or grease through the ball joint.

Still a further object of my invention is to provide means for preventing the shift lever from becoming disengaged from the shift forks by pulling upwardly against the pressure of the spring.

Still a further object of my invention is to provide novel means for lubricating the countershaft and the reverse idler jackshaft so that proper lubrication thereof may be insured at all times.

With these and other objects in view my invention consists in the arrangement, construction and combination of the various parts of my improved device, as described in the specification, claimed in the claim, and illustrated in the accompanying drawings, in which:

Figure 2 shows a vertical transverse sectional view taken on the line 2—2 of Figure 1.

Figure 3 shows a horizontal sectional view taken on the line 3—3 of Figure 2.

Figure 4 shows a view taken on the line 4—4 of Figure 2.

Figure 5 is an end elevation of the lower part of my improved transmission and illustrates the manner of locking in the countershaft and the reverse idler jackshaft.

Figure 6 shows an enlarged detail vertical central sectional longitudinal view illustrating the manner of lubricating the jackshaft.

Figure 7 shows the similar view taken at right angles to the plane of Figure 6.

Figures 1, 8, 9:
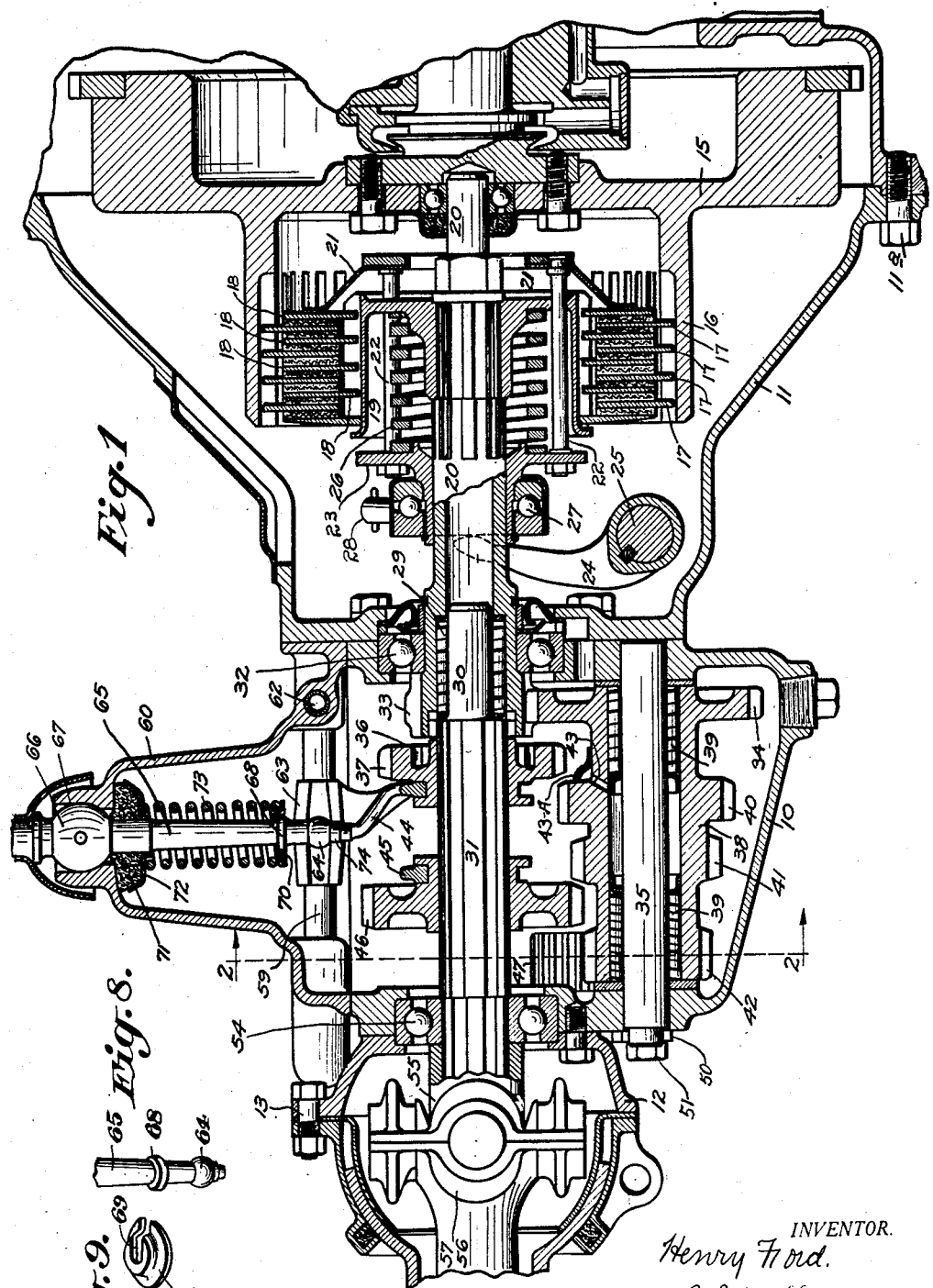
Figure 1 shows a vertical longitudinal sectional view through a transmission constructed in accordance with my invention.
Figure 8 shows a perspective view of the lower end of the gear shift lever.
Figure 9 shows a similar view of the retaining washer therefor.

Referring to the accompanying drawings I have used the reference numeral 10 to indicate generally the transmission housing proper. The clutch housing 11 is secured by screws 11ª to the forward end of this transmission housing and the universal joint housing 12 is secured to the rear of said transmission housing by the screws 13.

The fly wheel 15 is provided with an integral rearwardly extending sleeve 16 which is splined on its inner surface to co-act with correspondingly splined clutch discs 17. These discs 17 co-act with clutch discs 18 which are splined on to a sleeve 19 which in turn is splined on to the clutch shaft 20. The clutch pressure plate 21 is connected by a plurality of rods 22 with the clutch operating sleeve 23. This sleeve 23 is loosely mounted on the clutch shaft 20 so that a shift fork 24 may be moved by a clutch pedal shaft 25 to move the clutch operating sleeve 23 and consequently the clutch pressure plate 21 to throw out the clutch. A strong coil spring 26 extends between the front wall of the sleeve 19 and the clutch operating sleeve 23 to normally yieldingly pull the pressure plate 21 to position to engage the clutch discs 17 and 18. The clutch fork 24 works against a thrust ball bearing 27 which is mounted on the clutch operating sleeve 23. An Alemite fitting 28 is provided for lubricating the ball bearing 27.

The rear end of the clutch shaft 20 is hollow and extends into the transmission housing 10 so that a roller bearing 29 may be mounted therein to receive the pilot 30 at the forward end of the main transmission shaft 31. A ball bearing 32 is placed in the forward wall of the transmission housing 10 to form a bearing for the clutch shaft 20. The main transmission drive gear 33 is disposed at the rear end of the clutch shaft 20 and is formed integral therewith. It will be noted that this gear has relatively wide teeth thereon so that it may drive the gear 34 on the countershaft 35 whenever the clutch shaft 20 is being rotated and may also co-act with internal clutch teeth 36 in the gear 37 which is splined on to the transmission shaft 31 to form the high speed or direct drive. The gear 34 is formed integrally with a sleeve 38 which is mounted on roller bearings 39 on the countershaft 35. The intermediate speed gear is designated by the reference numeral 40, the low speed gear by the reference numeral 41, and the reverse gear by the reference numeral 42. These gears are all formed integrally with the sleeve 38 so that they all rotate at all times when the clutch shaft 20 is being rotated. This sleeve is provided with an oil hole 43 adjacent to the gear 40, and a scoop 43A is secured thereto so that oil from the transmission housing 10 will be scooped into the oil passageway 43, and conducted into the roller bearings 39.

The gear 37 is slidingly mounted on the shaft 31 and is adapted to be reciprocated from position in engagement with the drive gear 33 to position in engagement with the intermediate gear 40 by means of a shifter fork 44. These two positions of the gear 37 give respectively the direct and intermediate drive for this transmission. A similar fork 45 is provided to shift the low and reverse gear 46 into mesh with the low speed gear 41 or the reverse idler 47. The reverse idler gear is mounted on the stub shaft 48 which is mounted in bosses 49 in the transmission housing 10.

A locking plate 50 is secured to the transmission housing 10 by the cap screw 51, and its ends fit respectively into a notch 52 in the countershaft and the channel 53 in the reverse idler shaft 48. This plate 50 when it is screwed into the place therefore holds the countershaft 35 and the reverse idler gear shaft from rotary and axial movement.

The rear end of the transmission shaft 31 is journalled in a ball bearing 54 in the rear wall of the transmission housing 10 and this shaft 31 is connected with a forward member 55 of the universal joint 56 which in turn is connected to the drive shaft 57. The shift fork 44 is mounted on the shift shaft 58 and the fork 45 is mounted on the shift shaft 59. These shafts are mounted for longitudinal reciprocation in the cap or cover 60 of the transmission housing.

Means are provided for locking these shafts so that they cannot be operated to shift gears 37 and 46 at the same time and to hold the shift parts in the shifted or neutral position comprising the structure shown in Figure 3. In this structure, a pair of hollow plungers 61 are urged apart by a spring 62 so that their closed ends will engage the notches in the shifter shafts 58 and 59. These notches are, of course, placed so that the plungers 61 will engage these shafts when they are in either shifted position or in neutral position. The overall length of the two plungers 61 is just enough so that it is impossible to shift both of these shafts 58 and 59 at the same time. The spring 62 causes the plungers to engage the notches to yieldingly hold the shafts in their adjacent positions.

The shift shafts 58 and 59 are operated by a pair of forks 63 which extend therefrom for receiving the ball 64 on the lower end of the shift lever 65. This shift lever 65 has a ball 66 formed thereon which seats in a spherical socket 67 in the top of the transmission cover 60. Just above the ball 64, the shift lever is provided with an annular flange 68 upon which a dished washer 70 is mounted. The washer 70 is provided with a slot 69, as shown in Figure 8, so that it may be assembled over the flange 68. A felt washer 71 is disposed just below the spherical socket 67 in the transmission cover 60 and is pressed into contact with the walls of the cover 60 and the shift lever 65 by the metal washer 72 which in turn is pressed by the spring 73 which extends between the washer 72 and the washer 70. The shift lever 65 is provided with a lug 74 below the ball 64 so that the shift lever cannot be pulled up out of the contact with the forks 63 without removing the cover 60. From the construction just described it will be seen that the spring 73 serves to hold the shift lever 65 with the ball 66 in engagement with the spherical socket 67 to thereby hold the shift shaft in its proper position and to prevent rattle thereof; further, the washer 71 forms an oil and dust tight closure for the joint between the shift lever 65 and the interior of the transmission. When it is desired to detach the shift lever it is only necessary to compress the spring 73 somewhat so that the washer 70 may be slid sidewise upon the flange 68 which will release the spring 73, the washer 72, and gasket 71 so they may be slid off the shift lever 65 and the lever may then be pulled up out of the spherical socket 67. The reverse idler shaft 48 is hollow and provided with a bore 75 so that oil may be conducted from the housing 10 through this bore 75 and then into the inside of the idler gear 47 to lubricate same. The end of the bore is provided with a cup 76 to catch oil thrown by the low speed gear 41 and then flow by gravity along the wall 75 to the inside. This cup 76 is formed by making a cup shaped sheet metal number and then putting a hole in one side thereof near the bottom. This cup is then forced into the bore 75 in the shaft 48 with the hole in the bottom of the cup so that oil from the transmission may flow into the hole and into the bore 75.

Among the many advantages arising from the use of my improved device, it should be first pointed out that it is extremely simple to construct and operate. Still a further advantage results from the use of the spring 73 which locks the shift lever 65 in place and urges the washer 71 into contact with the transmission cover to prevent leakage of dust or grease. In other words, the spring 73 has the functions of preventing rattle, locking the shift lever in place, and insuring a continuous liquid tight joint between the parts.

Still a further advantage results from the use of the washer 70 whereby the shift lever may be readily removed from the cover by simply compressing the spring and sliding the washer 70 sideways.

Still a further advantage results from the use of the improved means of lubricating the countershaft whereby the said roller bearings are both lubricated from the one inlet opening in the sleeve carrying the countershaft gears so that an adequate supply of lubrication from the lubricant inside the transmission housing may be insured.

Still a further advantage results from the manner of lubricating the shaft carrying the reverse idler gear from the lubricant within the housing and from the general design of the parts which lend themselves readily to manufacture and installation.

Some changes may be made in the arrangement, construction and combination of the various parts of my improved device without departing from the spirit of my invention, and it is my intention to cover by my claim such changes as may reasonably be included within the scope thereof.

I claim as my invention:

In a device of the character described, a transmission housing having a cover, a shift rod extended through said cover, said shift rod having a ball and socket connection with said cover, a coil spring encircling said shift rod within said cover, a gasket member yieldingly urged by said spring to form a liquid tight joint between the shift rod and the casing, and a washer having an open side adapted to engage the shift rod and to be engaged by the spring to place the gasket and said ball and socket connection between the rod and cover under spring pressure, said washer being readily detachable from the rod by compressing the spring and moving the pressure washer laterally.

HENRY FORD.